United States Patent [19]

Tsutsui et al.

[11] Patent Number: 4,981,605
[45] Date of Patent: Jan. 1, 1991

[54] LIQUID MODIFIED ETHYLENIC RANDOM COPOLYMER AND ITS USES

[75] Inventors: Toshiyuki Tsutsui, Ohtake; Akinori Toyota; Norio Kashiwa, both of Iwakuni, all of Japan

[73] Assignee: Mitsui Petrochemical Industries, Ltd., Tokyo, Japan

[21] Appl. No.: 201,024

[22] Filed: Jun. 1, 1988

[30] Foreign Application Priority Data

Jun. 8, 1987 [JP] Japan .................................. 62-141584
Jun. 8, 1987 [JP] Japan .................................. 62-141585

[51] Int. Cl.$^5$ ........................................... C10M 145/00
[52] U.S. Cl. .................................. 252/52 A; 252/52 R; 526/332; 526/348; 549/512; 549/555; 568/852; 568/895
[58] Field of Search ............................ 252/52 A, 52 R; 526/348, 332; 549/512, 555; 568/895, 852

[56] References Cited

U.S. PATENT DOCUMENTS

| | | | |
|---|---|---|---|
| 2,833,787 | 5/1958 | Carlson et al. | 568/852 |
| 2,839,515 | 6/1958 | Davison et al. | 526/348 |
| 3,312,744 | 4/1967 | Farr, Jr. et al. | 568/852 |
| 3,340,241 | 9/1967 | Natta et al. | 526/348 |
| 3,472,826 | 10/1969 | Potts et al. | 568/852 |
| 3,899,434 | 8/1975 | Gardiner | 252/52 R |
| 4,118,427 | 10/1978 | Rhein et al. | 568/852 |
| 4,156,061 | 5/1980 | Pappas et al. | 526/20 |
| 4,234,748 | 11/1980 | Frampton et al. | 568/895 |
| 4,339,617 | 7/1982 | Imai et al. | 568/895 |
| 4,486,579 | 12/1984 | Machon et al. | 526/348 |
| 4,568,474 | 2/1986 | Theodore et al. | 252/52 R |
| 4,704,491 | 11/1987 | Tsutsui et al. | 585/512 |

FOREIGN PATENT DOCUMENTS 0200351 3/1986 European Pat. Off. .

*Primary Examiner*—Olik Chaudhuri
*Assistant Examiner*—Ellen McAvoy
*Attorney, Agent, or Firm*—Sherman and Shalloway

[57] ABSTRACT

A liquid modified ethylenic random copolymer selected from an epoxidization product of a liquid ethylenic random copolymer of ethylene and an alpha-olefin having 3 to 20 carbon atoms and a hydroxylation product of a liquid ethylenic random copolymer of ethylene and an alpha-olefin having 3 to 20 carbon atoms. The modified copolymer is characterized in that (i) the liquid modified ethylenic random copolymer has an ethylene component content of 10 to 85 mole % and an alpha-olefin component content of 15 to 90 mole %, (ii) in the $^{13}$C-NMR spectrum of the liquid modified ethylenic random copolymer, signals of $\alpha\beta$ and $\beta\gamma$ based on the methylene chain between two adjacent tertiary carbon atoms in the main chain of the copolymer are not observed, (iii) the liquid modified ethylenic random copolymer has a number average molecular weight ($\overline{M}n$), measured by a vapor pressure osmometer, of 200 to 10,000, and (iv) where the liquid modified ethylenic random copolymer is the epoxidized product, each epoxy group therein is positioned at the polymer chain end of the liquid ethylenic random copolymer, and the content of the epoxy groups is 0.01 to 0.5 mole per 100 g of the liquid epoxidized ethylenic random copolymer, and where the liquid modified ethylenic random copolymer is the hydroxylated product, each hydroxyl group therein is bonded to a carbon atom derived from ethylene or the alpha-olefin and positioned at the polymer chain end of the liquid ethylenic random copolymer, and the contents of the hydroxyl groups is 0.01 to 1 mole per 100 g of the liquid hydroxylated ethylenic random copolymer. Also provided are a lubricant oil additive and a paint additive each being composed of the above liquid modified ethylenic random copolymer.

33 Claims, No Drawings

LIQUID MODIFIED ETHYLENIC RANDOM COPOLYMER AND ITS USES

BACKGROUND OF THE INVENTION

1. Field of the Invention

This invention relates to a liquid modified ethylenic random copolymer and its uses. Specifically, it relates to a liquid epoxidized ethylenic random copolymer and a liquid hydroxylated ethylenic random copolymer and their uses. More specifically, it relates to a liquid epoxidized ethylenic random copolymer and a liquid hydroxylated ethylenic random copolymer which can exhibit excellent performance in such uses as a lubricant oil additive, a paint additive and a resin modifier.

2. Description of the Prior Art

Various additives are incorporated in lubricant oils such as gear oils, engine oils, greases, metal processing oils and mold releasing agents according to the purposes for which they are used. Most of these additives are polar compounds. For these additives to achieve the intended purposes, they are desirably soluble in base oils of these lubricant oils. Some of these additives have low affinity for the base oils, and remain merely dispersed is the base oils. Recently, conventional mineral oils as the base oils have been superseded by synthetic lubricants typified by olefinic polymer oils. These synthetic lubricant oils more noticeably have the above tendency, and in many cases, the effect of the additives to improve the performance of lubricant oils is not sufficiently exhibited. Accordingly, in the field of lubricant oils, there has been a strong demand for a solubility increasing agent which can increase the solubility of various lubricant oil additives in base oils.

In the field of paints, additives are incorporated according to various purposes. For example, ultrafine silica, ultrafine precipitated calcium carbonate, bentonite and organic bentonite have been used as a filler sedimentation inhibitor, an anti-sagging agent or a low temperature flexibility imparting agent. For some purposes of use, they do not sufficiently exhibit their performance. Accordingly, paint additives having excellent properties have been strongly desired.

SUMMARY OF THE INVENTION

It is a first object of this invention to provide a liquid epoxidized ethylenic random copolymer and a liquid hydroxylated ethylenic random copolymer which are novel substances.

A second object of this invention is to provide a lubricant oil additive composed of a liquid epoxidized ethylenic random copolymer and a lubricant oil additive composed of the liquid epoxidized ethylenic random copolymer.

A third object of this invention is to provide a paint additive composed of a liquid hydroxylated ethylenic random copolymer and a paint additive composed of the liquid hydroxylated ethylenic random copolymer.

In accordance with the invention, the first object of the invention is achieved by a liquid modified ethylenic random copolymer selected from an epoxidization product of a liquid ethylenic random copolymer of ethylene and an alpha-olefin having 3 to 20 carbon atoms and a hydroxylation product of a liquid ethylenic random copolymer of ethylene and an alpha-olefin having 3 to 20 carbon atoms; wherein (i) the liquid modified ethylenic random copolymer has an ethylene component content of 10 to 85 mole % and an alpha-olefin component content of 15 to 90 mole %, (ii) in the $^{13}$C-NMR spectrum of the liquid modified ethylenic random copolymer, signals of $\alpha\beta$ and $\beta\gamma$ based on the methylene chain between two adjacent tertiary carbon atoms in the main chain of the copolymer are not observed, (iii) the liquid modified ethylenic random copolymer has a number average molecular weight ($\overline{M}n$), measured by a vapor pressure osmometer, of 200 to 10,000, and (iv) where the liquid modified ethylenic random copolymer is the epoxidized product, each epoxy group therein is positioned at the polymer chain end of the liquid ethylenic random copolymer, and the content of the epoxy groups is 0.01 to 0.5 mole per 100 g of the liquid epoxidized ethylenic random copolymer, and where the liquid modified ethylenic random copolymer is the hydroxylated product, each hydroxyl group therein is bonded to a carbon atom derived from ethylene or the alpha-olefin and positioned at the polymer chain end of the liquid ethylenic random copolymer, and the content of the hydroxyl groups is 0.01 to 1 mole per 100 g of the liquid hydroxylated ethylenic random copolymer.

The second object of the invention is achieved by a lubricant oil additive composed of a liquid modified ethylenic random copolymer, said copolymer being selected from an epoxidization product of a liquid ethylenic random copolymer of ethylene and an alpha-olefin having 3 to 20 carbon atoms and a hydroxylation product of a liquid ethylenic random copolymer of ethylene and an alpha-olefin having 3 to 20 carbon atoms; wherein (i) the liquid modified ethylenic random copolymer has an ethylene component content of 10 to 85 mole % and an alpha-olefin component content of 15 to 90 mole %, (ii) in the $^{13}$C-NMR spectrum of the liquid modified ethylenic random copolymer, signals of $\alpha\beta$ and $\beta\gamma$ based on the methylene chain between two adjacent tertiary carbon atoms in the main chain of the copolymer are not observed, (iii) the liquid modified ethylenic random copolymer has a number average molecular weight ($\overline{M}n$), measured by a vapor pressure osmometer, of 200 to 10,000, and (iv) where the liquid modified ethylenic random copolymer is the epoxidized product, each epoxy group therein is possitioned at the polymer chain end of the liquid ethylenic random copolymer, and the content of the epoxy groups is 0.01 to 0.5 mole per 100 g of the liquid epoxidized ethylenic random copolymer, and where the liquid modified ethylenic random copolymer is the hydroxylated product, each hydroxyl group therein is bonded to a carbon atom derived from ethylene or the alpha-olefin and positioned at the polymer chain end of the liquid ethylenic random copolymer, and the content of the hydroxyl groups is 0.01 to 1 mole per 100 g of the liquid hydroxylated ethylenic random copolymer.

The third object of the invention is achieved by a paint additive composed of a liquid modified ethylenic random copolymer, said copolymer being selected from an epoxidization product of a liquid ethylenic random copolymer of ethylene and an alpha-olefin having 3 to 20 carbon atoms and a hydroxylation product of a liquid ethylenic random copolymer of ethylene and an alpha-olefin having 3 to 20 carbon atoms; wherein (i) the liquid modified ethylenic random copolymer has an ethylene component content of 10 to 85 mole % and an alpha-olefin component content of 15 to 90 mole %, (ii) in the $^{13}$C-NMR spectrum of the liquid modified ethylenic random copolymer, signals of $\alpha\beta$ and $\beta\gamma$ based on the methylene chain between two adjacent tertiary carbon atoms in the main chain of the copolymer are not observed, (iii) the liquid modified ethylenic random copolymer has a number average molecular weight ($\overline{Mn}$), measured by a vapor pressure osmometer, of 200 to 10,000, and (iv) where the liquid modified ethylenic random copolymer is the epoxidized product, each epoxy group therein is positioned at the polymer chain end of the liquid ethylenic random copolymer, and the content of the epoxy groups is 0.01 to 0.5 mole per 100 g of the liquid epoxidized ethylenic random copolymer, and where the liquid modified ethylenic random copolymer is the hydroxylated product, each hydroxyl group therein is bonded to a carbon atom derived from ethylene or the alpha-olefin and positioned at the polymer chain end of the liquid ethylenic random copolymer, and the content of the hydroxyl groups is 0.01 to 1 mole per 100 g of the liquid hydroxylated ethylenic random copolymer.

DETAILED DESCRIPTION OF THE PREFERRED EMBODIMENTS

The present inventors recognized that conventional lubricant oil additives have the problem described above, and made expensive investigations on lubricant oil additives which can exhibit excellent performance. These investigations have led to the discovery that a liquid epoxidized ethylenic random copolymer having the specific properties described above and a liquid hydroxylated ethylenic random copolymer having the specific properties described above are novel substances, and can achieve the aforesaid second object.

The invention will now be described in detail.

The liquid epoxidized ethylenic random copolymer of this invention is an epoxidization product of a liquid ethylenic random copolymer of ethylene and an alpha-olefin having 3 to 20 carbon atoms. The epoxy groups are each formed via a carbon-carbon unsaturated bond derived from ethylene or the alpha-olefin and positioned at the polymer chain end of the liquid ethylenic random copolymer, and at least one epoxy group per polymer chain is bonded. The liquid epoxidized ethylenic random copolymer has a pour point, measured in accordance with JIS K-2269, of not more than 50° C., and a dynamic viscosity at 100° C., measured in accordance with JIS K-2283, of not more than $1\times10^5$ centistokes.

The liquid epoxidized ethylenic random copolymer has an ethylene component content of 10 to 85 mole %, preferably 20 to 80 mole %, especially preferably 30 to 70 mole %, and an alpha-olefin component content of 15 to 90 mole %, preferably 20 to 80 mole %, especially preferably 30 to 70 mole %. If its ethylene component content is less than 10 mole %, and its alpha-olefin component content is larger than 90 mole %, or if its ethylene component content is larger than 85 mole % and its alpha-olefin component content is less than 15 mole %, a lubricant oil additive or a paint additive composed of this liquid modified copolymer has reduced performance.

In the $^{13}$C-NMR spectrum of the liquid modified ethylenic random copolymer, signals of $\alpha\beta$ and $\beta\gamma$ based on the methylene chain between two adjacent tertiary carbon atoms in the main chain of the copolymer are not observed.

The liquid epoxidized ethylenic random copolymer has a number average molecular weight ($\overline{Mn}$), measured by a vapor pressure osmometer (VPO), of 200 to 10,000, preferably 300 to 8,000, especially preferably 500 to 5,000. If its number average molecular weight is less than 200 or larger than 10,000, its performance as a lubricant oil additive or a paint additive is reduced.

The liquid epoxidized ethylenic random copolymer has an intrinsic viscosity [$\eta$], measured in decalin at 135° C. is 0 01 to 0.4 dl/g, preferably 0.02 to 0.35 dl/g, especially preferably 0.03 to 0.3 dl/g.

The liquid epoxidized ethylenic random copolymer has a molecular weight distribution ($\overline{Mw}/\overline{Mn}$), measured by gel permeation chromatography (GPC) of 1.1 to 4.0, preferably 1 2 to 3.0, especially preferably 1.3 to 2.5.

The epoxy group content of the liquid epoxidized modified ethylenic random copolymer is 0.01 to 0.5 mole, preferably 0.015 to 0.3 mole, especially preferabl 0.02 to 0.2 mole, per 100 g of the copolymer. If its epoxy group content is less than 0.01 mole, its performance as a lubricant oil additive or a paint additive is reduced. If its epoxy group content is larger than 0.5 mole per 100 g of the copolymer, its performance as a lubricant oil additive or a paint additive is reduced.

The liquid hydroxylated ethylenic random copolymer of this invention is a hydroxylation product of a liquid ethylenic random copolymer of ethylene and an alpha-olefin having 3 to 20 carbon atoms. In the hydroxylated ethylenic random copolymer, at least one hydroxyl group is bonded to at least one carbon atom forming a carbon-carbon double bond derived from ethylene or the alpha-olefin and positioned at the polymer chain end of the liquid ethylenic random copolymer. It has a pour point, measured in accordance with JIS K-2269, of not more than 50° C., and a dynamic viscosity at 100° C., measured in accordance with JIS K-2283, of not more than $1\times10^5$ centistokes.

The liquid hydroxylated ethylenic random copolymer has an ethylene component content of 10 to 85 mole %, preferably 20 to 80 mole %, especially preferably 30 to 70 mole %, and an alpha-olefin component content of 15 to 90 mole %, preferably 20 to 80 mole %, especially preferably 30 to 70 mole %. If its ethylene component content is less than 10 mole %, and its alpha-olefin component content is larger than 90 mole %, or if its ethylene component content is larger than 85 mole % and its alpha-olefin component content is less than 15 mole %, a lubricant oil additive or a paint additive composed of this liquid modified copolymer has reduced performance.

In the $^{13}$C-NMR spectrum of the liquid modified ethylenic random copolymer, signals of $\alpha\beta$ and $\beta\gamma$ based on the methylene chain between two adjacent tertiary carbon atoms in the main chain of the copolymer are not observed.

The liquid hydroxylated ethylenic random copolymer has a number average molecular weight ($\overline{Mn}$), measured by a vapor pressure osmometer (VPO), of 200 to 10,000, preferably 300 to 8,000, especially preferably 500 to 5,000. If its number average molecular weight is less than 200 or larger than 10,000, its performance as a lubricant oil additive or a paint additive is reduced.

The liquid hydroxylated ethylenic random copolymer has an intrinsic viscosity [η], measured in decalin at 135° C. is 0.01 to 0.4 dl/g, preferably 0.02 to 0.35 dl/g, especially preferably 0.03 to 0.3 dl/g.

The liquid hydroxylated ethylenic random copolymer has a molecular weight distribution ($\overline{Mw}/\overline{Mn}$), measured by gel permeation chromatography (GPC), of 1.1 to 4.0, preferably 1.2 to 3.0, especially preferably 1.3 to 2.5.

The hydroxyl group content of the liquid hydroxylated modified ethylenic random copolymer is 0.01 to 1 mole, preferably 0.015 to 0.5 mole, especially preferably 0.02 to 0.4 mole, per 100 g of the copolymer. If its hydroxyl group content is less than 0.01 mole per 100 g of the copolymer, its performance as a lubricant oil additive or a paint additive is reduced. If its hydroxyl group content is larger than 1 mole per 100 g of the copolymer, its performance as a lubricant oil additive or a paint additive is reduced.

The ethylenic random copolymer constituting the liquid epoxidized ethylenic random copolymer and the liquid hydroxylated ethylenic random copolymer is a liquid ethylenic random copolymer formed from ethylene and an alpha-olefin having 3 to 20 carbon atoms. It has an ethylene component content (a) of 10 to 85 mole %, preferably 20 to 80 mole %, especially preferably 30 to 70 mole %, and an alpha-olefin component content (b) of 15 to 90 mole %, preferably 20 to 80 mole %, especially preferably 30 to 70 mole %.

The liquid ethylenic random copolymer has an intrinsic viscosity [η], measured in decalin at 135° C., of usually 0.01 to 0.4 dl/g, preferably 0 03 to 0.3 dl/g, a number average molecular weight, measured by a vapor pressure osmometer, of usually 200 to 10,000, preferably 300 to 8,000, especially preferably 500 to 5,000, and a molecular weight distribution ($\overline{Mw}/\overline{Mn}$), measured by the GPC method, of usually not more than 4.0, preferably not more than 3.0, especially preferably not more than 2.5.

The iodine value of the liquid ethylenic random copolymer is 1 to 125, preferably 2 to 85. The liquid ethylenic random copolymer has a carbon-carbon unsaturated bond based on the ethylene units or alpha-olefin units at one end of the copolymer chain, or a mixture of copolymers having a carbon-carbon unsaturated bond based on the ethylene units or alpha-olefin units at one polymer chain and and copolymers not having a carbon-carbon unsaturated bond at one polymer chain end.

For use in the modification reaction for obtaining the liquid epoxidized ethylenic random copolymer and the liquid hydroxylated ethylenic random copolymer of this invention, the liquid ethylenic random copolymer preferably consists only of copolymers having a carbon-carbon unsaturated bond at one polymer chain end.

Specific examples of the alpha-olefin component having 3 to 20 carbon atoms as a constituent of the liquid ethylenic random copolymer include propylene, 1-butene, 1-hexene, 4-methyl-1-pentene, 3-methyl-1pentene, 1-octene, 1-decene, 1-dodecene, 1-tetradecene, 1-hexadecene, 1-octadecene and 1-eicocene. The liquid ethylenic random copolymer may, as required, contain a non-conjugated polyene component. Specific examples of the non-conjugated polyene include 1,4-hexadiene, 1,4-pentadiene, 1,7-octadiene, 1,8-nonadiene, 1,9-decadiene, 4-methyl-1,3-hexadiene, 5-methyl-1,4-hexadiene, 5-ethylidene-2-norbornene, dicyclopentadiene, 5-vinyl -2-norbornene, 5-methylene-2-norbornene, 1,5-cyclooctadiene and 5,8-endomethylenehexahydronaphthalene.

In the $^{13}$C-NMR spectrum of the liquid ethylenic random copolymer, signals of $\alpha\beta$ and $\beta\gamma$ based on the methylene chain between two adjacent tertiary carbon atoms in the main chain of the copolymer are not observed.

For example, in the following linkage of a copolymer of ethylene and 1-hexene, the three methylene groups at the center are located at the $\alpha$-, $\beta$- and $\gamma$-positions if viewed from the left-side tertiary carbon derived from 1-hexene, and are located at the $\alpha$-, $\beta$-, and $\gamma$-positions if viewed from the right-side tertiary carbon.

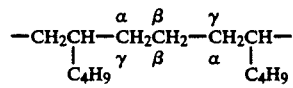

Hence, in the above linkage, there are methylene groups which give signals of $\alpha\gamma$ and $\beta\beta$, but there are no methylene groups which give signals of $\alpha\beta$ and $\beta\gamma$.

Likewise, in the following linkage resulting from head-to-tail linkage of 1-hexene moieties, only a methylene group which gives a signal of $\alpha\alpha$, but there is no methylene group which gives a signal of $\alpha\beta$ or $\beta\gamma$.

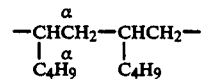

On the other hand, the following linkages

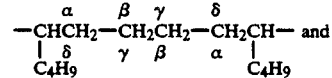

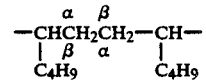

have methylene groups which gives signals of $\beta\gamma$ and $\alpha\beta$.

The liquid ethylenic random copolymer has a B value defined by the following formula of 1.03 to 2 ($1.03 \leq \overline{B} \leq 2$).

$$B = \frac{P_{OE}}{2P_O \cdot P_E}$$

In the formula, $P_E$ represents the molar fraction of the ethylene component content of the copolymer $P_O$ represents the molar fraction of the alpha-olefin component content, and $P_{OE}$ represents the molar fraction of the alpha-olefin/ethylene sequence in the total dyad sequence (provided that the molar fractions of these components in the above formula are calculated excepting the terminal components).

Larger B values show that the copolymer contains less block-like sequences for ethylenes or alpha-olefins and has a more uniform distribution of ethylene and the alpha-olefin and a narrower composition distribution.

Preferably, the liquid ethylenic random copolymer has the following B values.

Where the copolymer has an ethylene content of not more than 50 mole %:-

$$1.0 + 0.3 \times P_E \leq B \leq 1/(1-P_E)'$$

more preferably $$1.0 + 0.4 \times P_E \leq B \leq 1/(1-P_E)'$$

especially preferably $$1.0 + 0.5 \times P_E \leq B \leq 1/(1-P_E).$$

Where the copolymer has an ethylene content of more than 50 mole %:

$$1.3 - 0.3 \times P_E \leq B \leq 1/P_E'$$

more preferably $$1.4 - 0.4 \times P_E \leq B \leq 1/P_E'$$

especially preferably $$1.5 - 0.5 \times P_E \leq B \leq 1/pE.$$

The liquid ethylenic random copolymer can be produced by copolymerizing ethylene and an alpha-olefin having 3 to 20 carbon atoms and as required, a non-conjugated polyene in the presence of a catalyst composed of (a) a zirconium compound having a group containing a conjugated $\pi$ electron as a ligand and (b) an aluminoxane.

More specifically, the liquid ethylene random copolymer used in this invention can be produced, for example, by properly selecting the conditions in the processes proposed in Japanese Laid-Open Pat. Publication No. 221207/1986 and Japanese Pat. Application No. 259835/1985 filed by the present applicant. These processes comprise copolymerizing ethylene and an alpha-olefin in the presence of a catalyst formed from (A) a compound of a transition metal selected from the group consisting of elements of Groups IVb, Vb and VIb of the periodic table, and (B) an aluminoxane represented by the following general formula

or

wherein R represents a hydrocarbon group and m represents an integer of, preferably, at least 5.

The liquid epoxidized ethylenic random copolymer of this invention can be produced, for example, by the following methods.

(1) A method which comprises reacting an organic acid such as formic acid or acetic acid with hydrogen peroxide, and reacting the resulting reaction mixture with the liquid ethylenic random copolymer. The reaction of the copolymer is preferably carried out in the presence of a buffer such as sodium hydrogen phosphate, sodium carbonate or sodium hydrogen carbonate.

(2) A method which comprises reacting the liquid ethylenic random copolymer with an organic peroxide such as m-chloroperoxybenzoic acid.

More specifically, in the reaction of the organic acid with hydrogen peroxide in (1), the amount of the organic acid used is 2 to 50 moles, preferably 5 to 25 moles, per mole of hydrogen peroxide. The reaction temperature is 0° to 60° C., preferably 10° to 50° C. The time required for the reaction is 0.5 to 20 hours, preferably 1 to 10 hours. In reacting the reaction mixture of the organic acid and hydrogen peroxide with the liquid ethylenic random copolymer, the amount of hydrogen peroxide added is 1 to 10 moles, preferably 2 to 5 moles, per mole of the unsaturated bonds of the liquid ethylenic random copolymer. The amount of the organic acid added is 10 to 100 moles, preferably 20 to 50 moles, on the same basis. The amount of the buffer added is 0.05 to 0.5 mole, preferably 0.1 to 0.3 mole, per mole of the organic acid. The reaction temperature is 0° to 100° C., preferably 20° to 80° C., and the time required for this reaction is 1 to 30 hours, preferably 2 to 20 hours. The polymer concentration is 5 to 400 g/liter, preferably 10 to 300 g/liter.

In the method (2), the amount of the organic peroxide added is 1 to 10 moles, preferably 1 to 5 moles, per mole of the unsaturated bonds of the liquid ethylenic random copolymer. The reaction temperature is 0° to 100° C., preferably 10° to 80° C., and the time required for the reaction is 0.1 to 10 hours, preferably 0.5 to 5 hours. The polymer concentration is 5 to 400 g/liter, preferably 10 to 300 g/liter.

The liquid hydroxylated ethylenic random copolymer of this invention may be produced, for example, by the following methods.

(1) A method which comprises adding a hyoroborane such as diborane or 9-BBN (9-borabicyclo [3.3.1] -nonane) to the liquid ethylenic random copolymer and subjecting the copolymer to hydroboration reaction, and thereafter oxidizing the product with hydrogen peroxide.

(2) A method which comprises adding a mixture of an organic acid such as formic acid or acetic acid and hydrogen peroxide, and oxidizing the copolymer.

(3) A method which comprises adding an organic peroxide such as peroxyacetic acid or m-chloroperoxybenzoic acid and epoxidizing the copolymer, and thereafter hydrolyzing the product.

In the method (2), hydroxylation and esterification take place simultaneously to give a monohydroxylmonoesterified liquid modified ethylenic random copolymer. The ester group may be converted to a hydroxyl group by saponification. This gives a dihydroxylated liquid modified ethylenic random copolymer.

More specifically, in the method (1), the amount of the hydroborane added is 1 to 10 moles, preferably 2 to 5 moles, per mole of the unsaturated bonds of the liquid ethylenic random copolymer, and the amount of hydrogen peroxide added is 1 to 10 moles, preferably 2 to 5 moles, per mole of the hydroborane. The temperatures employed in the hydroboration and oxidation are −20° to 60° C., preferably 0° to 40° C. The time required for these reactions is 0.5 to 20 hours, preferably 1 to 10 hours. The polymer concentration is 5 to 200 g/liter, preferably 10 to 300 g/liter.

In the method (2), the amount of the organic acid added is 1 to 200 moles, preferably 5 to 100 moles per mole of the unsaturated bonds of the liquid ethylenic random copolymer, and the amount of hydrogen peroxide added is 1 to 50 moles, preferably 2 to 20 moles, on the same basis. The reaction temperature is 0° to 60° C., preferably 10° to 50° C. The time required for the reaction is 0.5 to 20 hours, preferably 1 to 10 hours. The polymer concentration is 5 to 400 g/liter, preferably 10 to 300 g/liter.

In the method (3), the amount of the organic peroxide added is 1 to 10 moles, preferably 1 to 5 moles per mole of the unsaturated bonds of the liquid ethylenic random copolymer. The reaction temperature in the hydroxylation is 0° to 100° C., preferably 10° to 80° C., and the time required for it is 0.1 to 10 hours, preferably 0.5 to 5 hours. The polymer concentration is 5 to 400 g/ liter, preferably 10 to 300 g/liter. In the hydrolysis, an aqueous solution of an alkali having a concentration of 0.5 to 5N, preferably 1 to 4N, is added in an amount of 10 to 100 ml, preferably 5 to 50 ml, per gram of the copolymer. The hydrolysis reaction temperature is 20° to 100° C., preferably 40° to 80° C., and the time required for it is 1 to 20 hours, preferably 2 to 10 hours.

Examples of a solvent which may be used in the production of the liquid epoxidized ethylenic random copolymer and the liquid hydroxylated ethylenic random copolymer (generically referred to as the liquid modified ethylenic random copolymer) of this invention include aromatic hydrocarbons such as benzene, toluene and xylene and ethers such as ethyl ether, tetrahydrofuran and dioxane.

The liquid modified ethylenic random copolymer of this invention can be used as a lubricant oil additive. It may be added to any of mineral oils and synthetic lubricant oils such as olefinic synthetic lubricant oils such as olefinic polymers or copolymers, silicone-type synthetic lubricant oils and ester-type synthetic lubricant oils. The amount of the liquid modified ethylenic random copolymer to be added is usually 0.5 to 300 parts by weight, preferably 0.8 to 200 parts by weight, especially preferably 1 to 150 parts by weight, per 100 parts by weight of the lubricant oil base. In addition to the liquid modified ethylenic random copolymer, various additives known to be added to lubricant oils may be incorporated. Specific examples of such known lubricant oil additives include mineral oils (neutral oils), log-molecular-weight alpha-olefin polymers, silicone TM type synthetic lubricant oils, estertype synthetic lubricant oils, stabilizers against oxidation, extreme pressure agents, rust inhibiting additives, defoamers and abrasion inhibitors.

Lubricant oils having the liquid modified ethylenic random copolymer of the invention incorporated therein may be used, for example, as gear oils, engine oils, greases, metal processing oils, and mold releasing agents.

The liquid modified ethylenic random copolymer of this invention may also be used as a paint additive. It may be added to paints containing condensation-type paint resins such is alkyd resins or modification products thereof, unsaturated polyester or modification products thereof, phenolic resin, epoxy resins or modification products thereof, amino resins (such as urea resins and melamine resins), polyurethane resins and drying oils; acrylic resins; and rubber-type paint resins as a film-forming resin component. The amount of the liquid modified ethylenic random copolymer to be added is usually 0.01 to 20 parts by weight, preferably 0.1 to 10 parts by weight, per 100 parts by weight of the film-forming components in the paint. A paint to which the modified ethylenic random copolymer of the invention is added may contain various known additives such as pigments, solvents (in the case of solvent-base paints), dispersion media (in the case of emulsion-type paints), levelling agents and stabilizers for weather in suitable amounts.

The liquid epoxidized ethylenic random copolymer and the liquid hydroxylated ethylenic random copolymer of this invention may also be used in other various applications, for example as dispersing agents for solid lubricant oil additives, processing aids for rubbers and resins, textile treating aids, modifiers for rubbers and resins, plasticizers, ink additives, metal ion scavengers, ion-exchanging agents, agricultural spreaders, plasticity imparting agents for paints, modifiers for paint primers, and modifiers for adhesives.

The present invention gives novel liquid modified (epoxidized or hydroxylated) ethylenic random copolymers which shows an excellent effect as a lubricant oil additive and a paint additive.

The following examples illustrate the present invention specifically.

The compositions and properties of the liquid modified ethylenic random copolymers and the starting liquid ethylenic random copolymer were measured and evaluated by the following methods.

(1) The ethylene, alpha-olefin, epoxy group and hydroxyl group contents were measured by $^{13}$C-NMR. Usually, the measuring conditions are the same as the measuring conditions for the B value to be described hereinbelow.

(2) The number average molecular weight ($\overline{M}n$) was measured in a customary manner by a vapor pressure osmometer in a toluene solvent at 80° C. using benzil and squalane as standand samples having known molecular weights.

(3) The molecular weight distribution $\overline{M}w/\overline{M}n$ was measured by the following procedure in accordance with "Gel Permeation Chromatography", written by Takeuchi, and published by Maruzen Co., Ltd.

(i) Using standard polystyrene having a known molecular weight (monodisperse polystyrene produced by Toyo Soda Co., Ltd.), molecular weight M and its GPC (gel permeation chromatography) count are measured, and a calibration curve of the molecular weight M and EV (elution volume) is prepared. The concentration at this time is set at 0.02 % by weight.

(ii) A GPC chromatograph of the sample is taken by GPC measurement. On the basis of (i) above, the number average molecular weight $\overline{M}n$ and the weight average molecular weight $\overline{M}w$ of the sample are calculated for polystyrene, and the $\overline{M}w/\overline{M}n$ is determined. The sample preparation conditions and the GPC measurement conditions are as follow:

SAMPLE PREPARATION (a) The sample and toluene as a solvent are taken into an Erlenmeyer flask so that the concentration of the sample is 0.1 % by weight.

(b) The Erlenmeyer flask is heated at 70° C. and filtered through a stainless steel filter (opening size 0.5 micron). The filtrate is subjected to GPC.

GPC MEASUREMENT CONDITIONS (a) Device: 150C-ALC/GPC made by Waters Co.
(b) Column: G4000H, G3000H and G2000H made by Toyo Soda Co., Ltd.
(c) Temperature: 70° C.
(d) Flow rate: 1.5 ml/min.

(4) B value

The B value of the liquid ethylenic random copolymer is defined as follows:

$$B = \frac{P_{OE}}{2P_O \cdot P_E}$$

In the formula, $P_E$ represents the molar fraction of the ethylene component content of the copolymer, $P_O$ represents the molar fraction of the alpha-olefin component content, and $P_{OE}$ represents the molar fraction of the alpha-olefin/ethylene sequence in the total dyad sequence (provided that the molar fractions of these components in the above formula are calculated excepting the terminal components).

The B value is an index representing the state of distribution of the individual monomer components in the copolymer, and is calculated from $P_E$, $P_O$ and $P_{OE}$ in the above definition on the basis of the papers of G. J. Ray: Macromolecules, 10, 773 (1977), J. C. Randall: Macromolecules, 15, 353 (1982), J. Polymer Science, Polymer Physics, Ed., 11, 275 (1973), and K. Kimura: Polymer, 25, 441 (1984). Larger B values show that the copolymer contains less block-like sequences for ethylenes or alpha-olefins and has more uniform distribution of ethylene and the alpha-olefin and narrower composition distribution.

$P_E$, $P_O$ and $P_{OE}$ are calculated by the following procedure. $^{13}$C-NMR spectrum of a sample prepared by uniformly dissolving about 200 mg of the copolymer in 1 ml of hexachlorobutadiene is taken under the following measuring conditions.

Temperature: 120° C.
Frequency: 25.05 MHz
Spectrum width 1500 Hz
Filter width: 1500 Hz
Pulse repeating time: 4.2 seconds
Pulse width: 7 microseconds
Number of pulses: 2000 to 5000.

From the spectrum, $P_E$, $P_O$ and $P_{OE}$ are determined.

Production of a liquid ethylenic random copolymer

REFERENTIAL EXAMPLE 1

[Preparation of aluminoxane]

Al$_2$(SO$_4$)$_3$·14H$_2$O (37 g) and 125 ml of toluene were fed into a fully nitrogen-purged 400 ml flask, and cooled to 0° C. Trimethyl aluminum (500 millimoles) diluted with 125 ml of toluene was added dropwise. The mixture was then heated to 40° C., and maintained at this temperature for 10 hours. After the reaction, the reaction mixture was filtered to perform solid-liquid separation. Toluene was removed from the filtrate to give 13 g of aluminoxane as a white solid. The aluminoxane had a molecular weight, determined by freezing point depression in benzene, of 930, and an m value of 14. For the polymerization to be described, it was used as a solution in toluene.

[Polymerization]

A 4-liter continuous polymerization reactor was continuously fed with 4 liters/hr of purified toluene, 20 milligram-atom/hr, as the aluminum atom, of the aluminoxane, and 0.16 milligram-atom/hr, as the zirconium atom, of bis(cyclopentadienyl)zirconium dichloride, and 110 liters/hr of ethylene and 500 liters/hr of propylene were simultaneously fed into the reactor and polymerized at a temperature of 30° C. under atmospheric pressure with a residence time of 0 5 hour under such conditions that the polymer concentration became 23 g/liter. Water was added to the resulting polymer solution to deash it. Toluene was removed, and the residue was dried under reduced pressure at 120° C. for 12 hours to give a liquid ethylenic random copolymer having an ethylene content of 42 mole %, a propylene content of 58 mole %, a number average molecular weight of 1,100, an intrinsic viscosity of 0.07 dl/g, a molecular weight distribution of 1.78, an iodine value of 23 and a B value of 1.26.

The copolymer was used in the modification in Example 1.

REFERENTIAL EXAMPLE 2

The same polymerization as in Referential Example 1 was carried out except that the amount of ethylene fed was changed to 140 liters/hr, the polymerization temperature was changed to 45° C., and the polymerization was carried out under such conditions that the polymer concentration became 26 g/liter. There was obtained a liquid ethylenic random copolymer having an ethylene content of 55 mole %, a propylene content of 45 mole %, a number average molecular weight of 600, an intrinsic viscosity of of 0.04 dl/g, a molecular weight distribution of 1.81, an iodine value of 41 and a B value of 1.27.

The copolymer was used in the modification in Example 2.

REFERENTIAL EXAMPLE 3

A 1.5-liter glass autoclave equipped with a condenser tube was charged with 500 ml of purified toluene and 500 ml of 1-hexene. A gaseous mixture of ethylene (120 liters/hr) and nitrogen (200 liters/hr) was passed through the autoclave. The temperature was raised to 45° C. Then, 5 0 milligram-atom, as the aluminum atom, of aluminoxane and 0.02 milligram-atom, as the zirconium atom, of bis(cyclopentadienyl)zirconium dichloride were introduced, and the polymerization was started. While the above gaseous mixture was fed continuously, the polymerization was carried out at 50° C. for 1 hour. Thereafter, the same operation as in Referential Example 1 was performed to give 105 g of a liquid ethylenic random copolymer having an ethylene content of 65 mole %, a 1-hexene content of 35 mole %, a number average molecular weight of 950, an intrinsic viscosity of 0.06 dl/g, a molecular weight distribution of 1.75, an iodine value of 26 and a B value of 1.28.

The copolymer was used in the modification in Example 3.

REFERENTIAL EXAMPLE 4

A 4-liter continuous polymerization reactor was continuously charged with 4 liters/hr of purified toluene, 20 milligram-atom/hr, as the aluminum atom, of aluminoxane and 0.16 milligram-atom/hr, as the zirconium atom, of bis(cyclopentadienyl)zirconium dichloride in toluene. Ethylene (200 liters/hr) and propylene (500 liters/hr) were simultaneously fed continuously into the polymerization reactor, and polymerized at a temperature of 40° C. under atmospheric pressure with a residence time of 0.5 hour under such conditions that the polymer concentration became 6 g/liter. Water was added to the resulting polymer solution to deash it. Toluene was removed, and the residue was maintained under reduced pressure at 120° C. for 12 hours to give a liquid ethylenic random copolymer having an ethylene content of 45 mole %, a propylene content of 55 mole %, a number average molecular weight of 700, an intrinsic viscosity of 0.05 dl/g, a molecular weight distribution of 1.80, an iodine value of 35 and a B value of 1.25.

The copolymer was used in the modification in Example 4.

REFERENTIAL EXAMPLE 5

Referential Example 4 was repeated except that the amount of ethylene fed was changed to 100 liters/hr, and the polymerization was carried out under such conditions that the polymer concentration became 22 g/liter. There was obtained a liquid ethylenic random copolymer having an ethylene content of 41 mole %, a propylene content of 59 mole %, a number average molecular weight of 620, an intrinsic viscosity of of 0.04 dl/g, a molecular weight distribution of 1.78, an iodine value of 41 and a B value of 1.24.

The copolymer was used in the modification in Example 5.

REFERENTIAL EXAMPLE 6

Referential Example 4 was repeated except that the amount of ethylene fed was changed to 100 liters/hr, 400 liters/hr of 1-butene was used instead of the propylene, the polymerization temperature was changed to 22° C., and the polymerization was carried out under such conditions that the polymer concentration became 25 g/liter. There was obtained a liquid ethylenic random copolymer having a ethylene content of 58 mole %, a 1-butene content of 42 mole %, a number average molecular weight of 1,500, at intrinsic viscosity of of 0.09 dl/g, a molecular weight distribution of 1.89, an iodine value of 17 and a B value of 1.28.

The copolymer was used in the modification in Example 6.

EXAMPLE 1

Toluene (54 ml) and 5.4 g of the liquid ethylenic random copolymer (Referential Example 1) were fed into a thoroughly nitrogen-purged 200 ml glass flask, and heated to 70° C. While maintaining the temperature at 70° C., 1.1g of m-chloroperoxybenzoic acid dissolved in 33 ml of toluene was added dropwise over 3 hours. The mixture was further maintained at 70° C. for 1 hour. The reaction mixture was cooled to 25° C., and 1.7 g of Na$_2$SO$_3$ was added. The mixture was stirred at 25° C. for 30 minutes. Then, the polymer solution was washed with a 5 % by weight aqueous solution of NaHCO$_3$ and water, and toluene was removed. The residue was dried to give 5.4 g of a colorless transparent liquid epoxidized ethylenic random copolymer having an ethylene content of 42 mole %, a propylene content of 58 mole %, a number average molecular weight of 1,100, a molecular weight distribution of 1.80, an epoxy group content of 0.09 mole/100 g of the copolymer, and an intrinsic viscosity of 0.07 dl/g. The $^{13}$C-NMR spectrum of the copolymer showed no peaks based on $\alpha\beta$ and $\beta\gamma$.

EXAMPLE 2

Acetic acid (16.2 g), 0.19 ml of conc. sulfuric acid and 2.6 g of a 35 % by weight aqueous solution of hydrogen peroxide were put in a thoroughly nitrogen purged 100 ml glass flask, and stirred at room temperature for 4 hours. Then, 2.3 g of sodium acetate trihydrate was added, and the mixture was stirred at room temperature for 20 minutes. Then, 7.2 g of Na$_2$HPO$_4$ was added, and the mixture was stirred for 5 minutes. Then, 7 ml of toluene and 5.4 g of the liquid ethylenic random copolymer (Referential Example 2) were added. The mixture was subsequently heated to 40° C. and stirred at this temperature for 17 hours. The polymer solution was then transferred to 100 ml of toluene, and worked up in the same way as in Example 1 to give 5.2 g of a colorless transparent liquid epoxidized ethylenic random copolymer having an ethylene content of 55 mole %, a propylene content of 45 mole %, a number average molecular weight of 610, a molecular weight distribution of 1.82, an epoxy group content of 0.15 mole/100 g of the copolymer, and an intrinsic viscosity of 0.04 dl/g. The $^{13}$C-NMR spectrum of the copolymer showed no peaks based on $\alpha\beta$ and $\beta\gamma$.

EXAMPLE 3

Example 1 was repeated except that the liquid ethylenic random copolymer obtained in Referential Example 3 was used instead of the copolymer used in Example 1. There was obtained 5.3 g of a colorless transparent liquid epoxidized ethylenic random copolymer having an ethylene content of 65 mole %, a propylene content of 35 mole %, a number average molecular weight of 970, a molecular weight distribution of 1.82, an epoxy group content of 0.09 mole/100 g of the copolymer, and an intrinsic viscosity of 0.07 dl/g. The $^{13}$C-NMR spectrum of the copolymer showed no peaks based on $\alpha\beta$ and $\beta\gamma$.

EXAMPLE 4

A 0.5M THF solution (42 ml) of 9-BBN was put in a thoroughly nitrogen-purged 400 ml glass flask and cooled to 10° C. While maintaining the temperature at 10° C., 5.0 g of the liquid ethylenic random copolymer (Referential Example 4) diluted with 107 ml of THF was added dropwise over 5 minutes. After the addition, the mixture was stirred at 23° C. for 5 hours. The mixture was then cooled to 0° C., and a 3N aqueous solution of NaOH was added. Furthermore, 7.1 g of a 35% by weight aqueous solution of hydrogen peroxide was added dropwise over 15 minutes. The temperature in the reaction system rose at this time from 0° to 22° C. Subsequently, the temperature was elevated to 30° C., and the reaction was continued at this temperature for 2 hours. After the reaction, the temperature was lowered to 15° C., and 50 ml of a saturated aqueous solution of K$_2$CO$_3$ was added. The mixture was then extracted with hexane, and hexane was removed from the polymer solution. The residue was dried to give 5.0 g of a colorless transparent liquid hydroxylated ethylenic random copolymer having an ethylene content of 45 mole %, a propylene content of 55 mole %, a number average molecular weight of 720, a molecular weight distribution of 1.84, a hydroxyl group content of 0.13 mole/100 g of the copolymer, and an intrinsic viscosity of 0.05 dl/g. The $^{13}$C-NMR spectrum of the copolymer showed no peaks based on $\alpha\beta$ and $\beta\gamma$.

EXAMPLE 5

THF (21 ml) and 16.2 g of the liquid ethylenic random copolymer (Referential Example 5) were fed into a thoroughly nitrogen-purged 30 ml glass flask, and at room temperature, 37.3 g of formic acid and then 7.9 g of a 35 % by weight aqueous solution of hydrogen peroxide were added. The mixture was heated to 40° C., and vigorously stirred at this temperature for 8 hours. The temperature was then lowered to 0° C., and 205 ml of a 10% by weight aqueous solution of Na$_2$SO$_3$ was added dropwise over 15 minutes. At this time, the temperature of the reaction system rose from 0° to 20° C. The mixture was further stirred at room temperature for 30 minutes. The reaction mixture was extracted with hexane. Hexane was removed from the polymer solution and the residue was dried to give 17.1 g of a colorless transparent hydroxylated ethylenic random copolymer having an ethylene content of 41 mole %, a propylene content of 59 mole %, a number average molecular weight of 670, a molecular weight distribution of 1.76, a hydroxyl group content of 0.15 mole/100 g of the copolymer, a formate group content of 0.15 mole/100 g of the copolymer and an intrinsic viscosity of 0.05 dl/g. The $^{13}$C-NMR spectrum of the copolymer showed no peaks based on $\alpha\beta$ and $\beta\gamma$.

EXAMPLE 6

THF (7 ml) and 5.4 g of the liquid ethylenic random copolymer (Referential Example 6) were fed into a thoroughly nitrogen-purged 100 ml glass flask, and at room temperature, 12.4 g of formic acid and 2.6 g of a 35 % aqueous solution of hydrogen peroxide were added. Then, the mixture was heated to 40° C. and vigorously stirred at this temperature for 8 hours. The temperature was then lowered to room temperature, and 68 ml of a 10% by weight aqueous solution of Na$_2$SO$_3$ was added dropwise over 5 minutes. The reaction mixture was worked up in the same way as in Example 5 to give 5.5 g of a colorless transparent hydroxylated ethylenic random copolymer having an ethylene content of 58 mole %, a 1-butene content of 42 mole %, a number average molecular weight of 1,600, a molecular weight distribution of 1.93, a hydroxyl group content of 0.056 mole/100 g of the copolymer, a formate group content of 0.056 mole/100 g of the copolymer and an intrinsic viscosity of 0.10 dl/g. The $^{13}$C-NMR spectrum of the copolymer showed no peaks based on $\alpha\beta$ and $\beta\gamma$.

TEST EXAMPLE 1

The properties of the liquid epoxidized ethylenic random copolymers of this invention as a lubricant oil additive were tested by the following method.
(1) Sample preparation Sixty-five parts by weight of poly-alpha-olefin oligomer A (Mobil BHF-1001 produced by Mobil Chemicals) and 35 parts by weight of poly-alpha-olefin oligomer B (Synfluid 6 cst PAO produced by Chevron Chemical Co.) were taken into a 300 ml beaker, and well mixed by using a glass rod. One part by weight of a commercial gear oil package-type additive (TC9535; S 24.1 %, P 1.8 % produced by Texaco Co., Ltd.) and 3 parts by weight of each of the epoxidized copolymers obtained in Example 1 or 3 were added, and the mixture was further stirred to prepare a lubricant oil sample (I). By the same method, a comparative lubricant oil sample (II) was prepared without adding the epoxidized copolymer.
(2) Testing methods
 (i) Compatibility One hundred milliliters of the sample was taken into a glass vessel having a diameter of 40 mm. After standing over night, the absorbance at a wavelength of 660 nm (cell: glass 50 mm; reference: hexane) was measured by means of a spectrophotometer, and the transparency of the sample was examined.

The results was rated as follows:

| Absorbance | Rating |
| --- | --- |
| below 0.05 | 5 |
| 0.05–0.15 | 4 |
| 0.15–0.25 | 3 |
| 0.25–0.35 | 2 |
| above 0.35 | 1 |

(ii) Thermal stability

After the compatibility test, the glass vessel containing the sample was put in a constant-temperature vessel at 80° C. for 1 month. It was then taken out, and allowed to cool overnight at room temperature. Then, by the same method as in (i) above, the transparency of the sample was evaluated.
 (iii) Resistance to emulsification In accordance with the method of JIS K-2520, the time which elapsed until an emulsion layer disappeared was examined. The result was rated as follows:

| Emulsion layer disappearance time (minutes) | Rating |
| --- | --- |
| below 10 | 5 |
| 10–30 | 4 |
| 30–60 | 3 |
| 60–480 | 2 |
| above 480 | 1 |

(3) Test results

TABLE 1

| Test item | Sample (I) Example 1 | Sample (I) Example 2 | Sample (II) |
| --- | --- | --- | --- |
| Compatibility | 4 | 4 | 2 |
| Thermal stability | 4 | 4 | 1 |
| Resistance to emulsification | 5 | 5 | 5 |

TEST EXAMPLE 2

The properties of the liquid epoxidized ethylenic random copolymers of the invention as a paint additive was tested by the following method.
(1) Sample preparation Eighty-five parts by weight of an epoxy resin A (Epomic R-140 produced by Mitsui Petrochemical Industries, Ltd.), 15 parts by weight of an epoxy resin (Epomic R-094 produced by the safe company as above) and 5 parts of the epoxidized copolymer obtained in Example 2 were well xixed, and 35 parts of silica powder (Crystallite A-1 produced by Tatsumori Kogyo Co., Ltd.) was added. The mixture was well stirred to give an epoxy paint (I). By the same method as above, a comparative epoxy paint (II) was prepared using a commercial vegetable oil polymerized type sedimentation inhibitor instead of the epoxidized copolymer.
(2) Testing methods
 (i) Pigment sedimentation rate The sample was put to a height of 40 mm in a glass container having an inside diameter of 18 mm and a height of 45 mm and equipped with a cap. After standing for 1 month, the pigment sedimentation rate was calculated by the following formula.

$$\text{Pigment sedimentation rate (\%)} = \frac{L}{L_o} \times 100$$

where $L_o$: Filling height (40 mm) of the pigment

L: Height (mm) of the upper clear layer resulting from sedimentation of the pigment on standing for 1 month.

(ii) Sagging property

One hundred parts by weight of the paint sample was well mixed with 28 parts by weight of a modified polyamine-type hardener (Epomic Q-636 produced by Mitsui Petrochemical Industries, Ltd.), and the mixture was coated on a glass plate. Immediately then the coated glass plate was vertically fixed and the coating was cured in this state. While the degree of sagging was observed, the maximum thickness of the coating at which the coating did not sag was measured.

(3) Test results

TABLE 2

| Test item | Epoxy paint (I) | Epoxy paint (II) |
| --- | --- | --- |
| Pigment sedimentation rate % | 0 | 60 |
| Sagging property (maximum coating thickness, microns) | 115 | below 75 |

TEST EXAMPLE 3

The properties of the liquid hydroxylated ethylenic random copolymers of this invention as a lubricant oil additive were tested by the following method.

(1) Sample preparation

Sixty-five parts by weight of poly-alpha-olefin oligomer A (Mobil SHF-1001 produced by Mobil Chemicals) and 35 parts by weight of poly-alpha-olefin oligomer B (Synfluid 6 cst PAO produced by Chevron Chemical Co.) were taken into a 300 ml beaker, and well mixed by using a glass rod. One part by weight of a commercial gear oil package-type additive (TC9535; S 24.1%, P 1.8% produced by Texaco Co., Ltd.) and 2 parts by weight of each of the hydroxylated copolymers obtained in Example 4 or 6 were added, and the mixture was further stirred to prepare a lubricant oil sample (I). By the same method, a comparative lubricant oil sample (II) was prepared without adding the hydroxylated copolymer.

(2) Testing methods

By the same methods as in Test Example 1, the compatibility, thermal stability and resistance to emulsification of the samples were tested.

(3) Test results

TABLE 3

| Test item | Sample (I) Example 4 | Sample (I) Example 5 | Sample (II) |
| --- | --- | --- | --- |
| Compatibility | 4 | 4 | 2 |
| Thermal stability | 4 | 4 | 1 |
| Resistance to emulsification | 5 | 5 | 5 |

TEST EXAMPLE 4

The properties of the liquid hydroxylated ethylenic random copolymers of the invention as a paint additive was tested by the following method.

(1) Sample preparation

Eighty-five parts by weight of an epoxy resin A (Epomic R-140 produced by Mitsui Petrochemical Industries, Ltd ), 15 parts by weight of an epoxy resin (Epomic R-094 produced by the same company as above) and 3 parts of the hydroxylated copolymer obtained in Example 5 were well mixed, and 35 parts of silica powder (Crystallite A-1 produced by Tatsumori Kogyo Co., Ltd.) was added. The mixture was well stirred to give an epoxy paint (I). By the same method as above, a comparative epoxy paint (II) was as prepared using a commercial vegetable oil polymerized type sedimentation inhibitor instead of the hydroxylated copolymer.

(2) Testing methods

By the same methods as in Test Example 2, the pigment sedimentation rate and the sagging property of the sample paints were tested.

TABLE 4

| Test item | Epoxy paint (I) | Epoxy paint (II) |
| --- | --- | --- |
| Pigment sedimentation rate % | 0 | 60 |
| Sagging property (maximum coating thickness, microns) | 110 | below 75 |

What is claimed is:

1. A liquid modified ethylenic random copolymer selected from an epoxidization product of a liquid ethylenic random copolymer of ethylene and an alpha-olefin having 3 to 20 carbon atoms and a hydroxylation product of a liquid ethylenic random copolymer of ethylene and an alpha-olefin having 3 to 20 carbon atoms; wherein (i) the liquid modified ethylenic random copolymer has an ethylene component content of 10 to 85 mole % and an alpha-olefin component content of 15 to 90 mole %, (ii) in the $^{13}$C-NMR spectrum of the liquid modified ethylenic random copolymer, signals of $\alpha\beta$ and $\beta\gamma$ based on the methylene chain between two adjacent tertiary carbon atoms in the main chain of the copolymer are not observed, (iii) the liquid modified ethylenic random copolymer has a number average molecular weight ($\overline{M}n$), measured by a vapor pressure osmometer, of 200 to 10,000, and (iv) where the liquid modified ethylenic random copolymer is the epoxidized product, each epoxy group therein is positioned at the polymer chain end of the liquid etyylenic random copolymer, and the content of the epoxy groups is 0.01 to 0.5 mole per 100 g of the liquid epoxidized ethylenic random copolymer, and where the liquid modified ethylenic random copolymer is the hydroxylated product, each hydroxyl group therein is bonded to a carbon atom derived from ethylene or the alpha-olefin and positioned at the polymer chain end of the liquid ethylenic random copolymer, and the content of the hydroxyl groups is 0.01 to 1 mole per 100 g of the liquid hydroxylated ethylenic random copolymer.

2. The copolymer of claim 1 which is the liquid epoxidized ethylenic random copolymer.

3. The copolymer of claim 2 which has an ethylene component content of 20 to 80 mole % and an alpha-olefin component content of 20 to 80 mole %, a number average molecular weight, measured by a vapor pressure osmometer, of 300 to 8,000, and an epoxy group content of 0.015 to 0.3 mole per 100 g of the copolymer.

4. The copolymer of claim 2 which has an ethylene component content of 30 to 70 mole % and an alpha-olefin component content of 30 to 70 mole %, a number average molecular weight, measured by a vapor pressure osmometer, of 500 to 5,000, and an epoxy group content of 0.02 to 0.2 mole per 100 g of the copolymer.

5. The copolymer of claim 4 wherein the alpha-olefin is propylene or 1-hexene.

6. The copolymer of claim 5 which has a molecular weight distribution, measured by gel permeation chromatography, of 1.3 to 2.5.

7. The copolymer of claim 1 which is the liquid hydroxylated ethylenic random copolymer.

8. The copolymer of claim 7 which has an ethylene component content of 20 to 80 mole % and an alpha-olefin component content of 20 to 80 mole %, a number average molecular weight, measured by a vapor pressure osmometer, of 300 to 8,000, and a hydroxyl group content of 0.015 to 0.5 mole per 100 g of the copolymer.

9. The copoymer of claim 7 which has an ethylene component content of 30 to 70 mole % and an alpha-olefin component content of 30 to 70 mole %, a number average molecular weight, measured by a vapor pressure osmometer, of 500 to 5,000, and a hydroxyl group content of 0.02 to 0.4 mole per 100 g of the copolymer.

10. The copolymer of claim 9 wherein the alpha-olefin is propylene or 1-butene.

11. The copolymer of claim 10 which has a molecular weight distribution, measured by gel permeation chromatography, of 1.3 to 2.5.

12. A lubricant oil additive composed of a liquid modified ethylenic random copolymer, said copolymer being selected from an epoxidization product of a liquid ethylenic random copolymer of ethylene and an alpha-olefin having 3 to 20 carbon atoms and a hydroxylation product of a liquid ethylenic random copolymer of ethylene and an alpha-olefin having 3 to 20 carbon atoms; wherein (i) the liquid modified ethylenic random copolymer has an ethylene component content of 10 to 85 mole % and an alpha-olefin component content of 15 to 90 mole %, (ii) in the $^{13}$C-NMR spectrum of the liquid modified ethylenic random copolymer, signals of $\alpha\beta$ and $\beta\gamma$ based on the methylene chain between two adjacent tertiary carbon atoms in the main chain of the copolymer are not observed, (iii) the liquid modified ethylenic random copolymer has a number average molecular weight ($\overline{M}n$), measured by a vapor pressure osmometer, of 200 to 10,000, and (iv) where the liquid modified ethylenic random copolymer is the epoxidized product, each epoxy group therein is positioned at the polymer chain end of the liquid ethylenic random copolymer, and the content of the epoxy groups is 0.01 to 0.5 mole per 100 g of the liquid epoxidized ethylenic random copolymer, and where the liquid modified ethylenic random copolymer is the hydroxylated product, each hydroxyl group therein is bonded to a carbon atom derived from ethylene or the alpha-olefin and positioned at the polymer chain end of the liquid ethylenic random copolymer, and the content of the hydroxyl groups is 0.01 to 1 mole per 100 g of the liquid hydroxylated ethylenic random copolymer.

13. The lubricant oil additive of claim 12 wherein the liquid modified ethylenic random copolymer is the liquid epoxidized ethylenic random copolymer.

14. The lubricant oil additive of claim 13 wherein the liquid epoxidized ethylenic random copolymer has an ethylene component content of 20 to 80 mole % and an alpha-olefin component content of 20 to 80 mole %, a number average molecular weight, measured by a vapor pressure osmometer, of 300 to 8,000, and an epoxy group content of 0.015 to 0.3 mole per 100 g of the copolymer.

15. The lubricant oil additive of claim 13 wherein the liquid epoxidized ethylenic random copolymer has an ethylene component content of 30 to 70 mole % and an alpha-olefin component content of 30 to 70 mole %, a number average molecular weight, measured by a vapor pressure osmometer, of 500 to 5,000, and an epoxy group content of 0.02 to 0.2 mole per 100 g of the copolymer.

16. The lubricant oil additive of claim 15 wherein the alpha-olefin is propylene or 1-hexene.

17. The lubricant oil additive of claim 16 wherein the liquid epoxidized ethylenic random copolymer has a molecular weight distribution, measured by gel permeation chromatography, of 1.3 to 2.5.

18. The lubricant oil additive of claim 12 wherein the liquid modified ethylenic random copolymer is the liquid hydroxylated ethylenic random copolymer.

19. The lubricant oil additive of claim 18 wherein the liquid hydroxylated ethylenic random copolymer has an ethylene component content of 20 to 80 mole % and an alpha-olefin component content of 20 to 80 mole %, a number average molecular weight, measured by a vapor pressure osmometer, of 300 to 8,000, and a hydroxyl group content of 0 015 to 0.5 mole per 100 g of the copolymer.

20. The lubricant oil additive of claim 18 wherein the liquid hydroxylated ethylenic random copolymer has an ethylene component content of 30 to 70 mole % and an alpha-olefin component content of 30 to 70 mole %, a number average molecular weight, measured by a vapor pressure osmometer, of 500 to 5,000, and a hydroxyl group content of 0.02 to 0.4 mole per 100 g of the copolymer.

21. The lubricant oil additive of claim 20 wherein the alpha-olefin is propylene or 1-hexene.

22. The lubricant oil additive of claim 21 wherein the liquid hydroxylated ethylenic random copolymer has a molecular weight distribution, measured by gel permeation chromatography, of 1.3 to 2.5.

23. A paint additive composed of a liquid modified ethylenic random copolymer, said copolymer being selected from an epoxidization product of a liquid ethylenic random copolymer of ethylene and an alpha-olefin having 3 to 20 carbon atoms and a hydroxylation product of a liquid ethylenic random copolymer of ethylene and an alpha-olefin having 3 to 20 carbon atoms; wherein (i) the liquid modified ethylenic random copolymer has an ethylene component content of 10 to 85 mole % and an alpha-olefin component content of 15 to 90 mole %, (ii) in the $^{13}$C-NMR spectrum of the liquid modified ethylenic random copolymer, signals of $\alpha\beta$ and $\beta\gamma$ based on the methylene chain between two adjacent tertiary carbon atoms in the main chain of the copolymer are not observed, (iii) the liquid modified ethylenic random copolymer has a number average molecular weight (Mn) measured by a vapor pressure osmometer, of 200 to 10,000, and (iv) where the liquid modified ethylenic random copolymer is the epoxidized product, each epoxy group therein is positioned at the polymer chain end of the liquid ethylenic random copolymer, and the content of the epoxy groups is 0.01 to 0.5 mole per 100 g of the liquid epoxidized ethylenic random copolymer, and where the liquid modified ethylenic random copolymer is the hydroxylated product, each hydroxyl group therein is bonded to a carbon atom derived from ethylene or the alpha-olefin and positioned at the polymer chain end of the liquid ethylenic random copolymer, and the contents of the hydroxyl groups is 0.1 to 1 mole per 100 g of the liquid hydroxylated ethylenic random copolymer.

24. The paint additive of claim 23 wherein the liquid modified ethylenic random copolymer is the liquid epoxidized ethylenic random copolymer.

25. The paint additive of claim 24 wherein the liquid epoxidized ethylenic random copolymer has an ethylene component content of 20 to 80 mole % and an alpha-olefin component content of 20 to 80 mole %, a number average molecular weight, measured by a vapor pressure osmometer, of 300 to 8,000, and an epoxy group content of 0.015 to 0.3 mole per 100 g of the copolymer.

26. The paint additive of claim 24 wherein the liquid epoxidized ethylenic random copolymer has an ethylene component content of 30 to 70 mole % and an alpha-olefin component content of 30 to 70 mole %, a number average molecular weight, measured by a vapor pressure osmometer, of 500 to 5,000, and an epoxy group content of 0.02 to 0.2 mole per 100 g of the copolymer.

27. The paint additive of claim 26 wherein the alpha-olefin is propylene or 1-hexene.

28. The paint additive of claim 27 wherein the liquid epoxidized ethylenic random copolymer has a molecular weight distribution, measured by gel permeation chromatography, of 1.3 to 2.5.

29. The paint additive of claim 23 wherein the liquid modified ethylenic random copolymer is the liquid hydroxylated ethylenic random copolymer.

30. The paint additive of claim 29 wherein the liquid hydroxylated ethylenic random copolymer has an ethylene component content of 20 to 80 mole % and an alpha-olefin component content of 20 to 80 mole %, a number average molecular weight, measured by a vapor pressure osmometer, of 300 to 8,000, and a hydroxyl group content of 0.015 to 0.5 mole per 100 g of the copolymer.

31. The paint additive of claim 29 wherein the liquid hydroxylated ethylenic random copolymer has an ethylene component content of 30 to 70 mole % and an alpha-olefin component content of 30 to 70 mole %, a number average molecular weight, measured by a vapor pressure osmometer, of 500 to 5,000, and a hydroxyl group content of 0.02 to 0.4 mole per 100 g of the copolymer.

32. The paint additive of claim 31 wherein the alpha-olefin is propylene or 1-butene.

33. The paint additive of claim 32 wherein the liquid hydroxylated ethylenic random copolymer has a molecular weight distribution, measured by gel permeation chromatography, of 1.3 to 2.5.

* * * * *